(12) United States Patent
Loui et al.

(10) Patent No.: US 7,311,059 B2
(45) Date of Patent: Dec. 25, 2007

(54) WATERCRAFT HULL WITH ENTRAPMENT TUNNEL

(75) Inventors: Steven Loui, Honolulu, HI (US); Scott Yamashita, Honolulu, HI (US); Gary Shimozono, Kapolei, HI (US)

(73) Assignee: Navatek, Ltd., Honolulu, HI (US)

( * ) Notice: Subject to any disclaimer, the term of this patent is extended or adjusted under 35 U.S.C. 154(b) by 17 days.

(21) Appl. No.: 11/315,304

(22) Filed: Dec. 23, 2005

(65) Prior Publication Data

US 2006/0137592 A1 Jun. 29, 2006

Related U.S. Application Data

(60) Provisional application No. 60/639,856, filed on Dec. 27, 2004.

(51) Int. Cl.
*B63B 1/32* (2006.01)

(52) U.S. Cl. ...................... 114/288; 114/289

(58) Field of Classification Search ........... 114/288, 114/289
See application file for complete search history.

(56) References Cited

U.S. PATENT DOCUMENTS

| | | | |
|---|---|---|---|
| 1,265,035 A | 5/1918 | Bazaine | |
| 1,665,149 A | 4/1928 | Van Wienen | |
| 2,753,135 A | 7/1956 | Gouge | 244/106 |
| 3,146,752 A | 9/1964 | Ford | 114/67 |
| 3,528,380 A | 9/1970 | Yost | 114/66.5 |
| 3,561,389 A | 2/1971 | Hunt | 114/66.5 |
| 3,662,700 A | 5/1972 | Roumejon | 114/67 |
| 4,067,286 A | 1/1978 | Stout et al. | 114/283 |
| 4,371,350 A | 2/1983 | Kruppa et al. | 440/69 |
| 4,649,847 A | 3/1987 | Tinkler et al. | 114/39 |
| 4,682,560 A | 7/1987 | Lieb et al. | 114/343 |
| 4,689,026 A | 8/1987 | Small | 440/66 |
| 4,713,028 A | 12/1987 | Duff | 440/61 |
| 4,821,663 A | 4/1989 | Schad | 114/43 |
| 4,915,668 A | 4/1990 | Hardy | 440/69 |
| 4,924,792 A | 5/1990 | Sapp et al. | 114/61 |
| 4,926,771 A * | 5/1990 | Hull | 114/289 |
| 4,977,845 A | 12/1990 | Rundquist | 114/289 |
| 5,111,767 A | 5/1992 | Haines | 114/288 |
| 5,415,120 A | 5/1995 | Burg | 114/67 |
| 5,588,389 A | 12/1996 | Carter, Jr. | 114/271 |
| 6,006,689 A | 12/1999 | Olofsson | 114/285 |
| 6,125,781 A | 10/2000 | White | 114/288 |
| 6,406,341 B1 | 6/2002 | Morejohn | 440/69 |
| 6,425,341 B1 | 7/2002 | Devin | 114/288 |
| 6,604,478 B2 | 8/2003 | Barsumian | 114/67 |

* cited by examiner

*Primary Examiner*—Stephen Avila
(74) *Attorney, Agent, or Firm*—Fitzpatrick, Cella, Harper & Scinto

(57) ABSTRACT

A watercraft hull has at least one bent entrapment tunnel with an aft portion whose tunnel ceiling is at a higher elevation than portions of the tunnel ceiling immediately in front of it to provide a negative angle of attack with the free surface at design planing speeds.

37 Claims, 7 Drawing Sheets

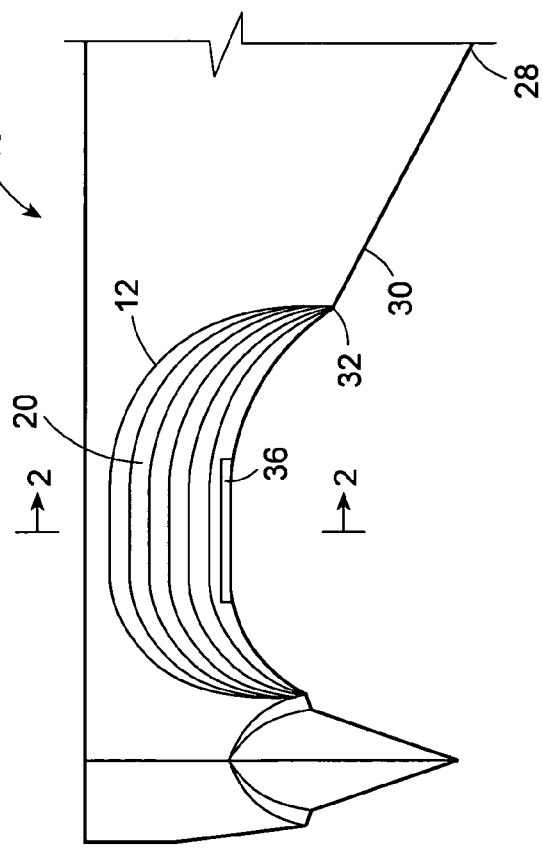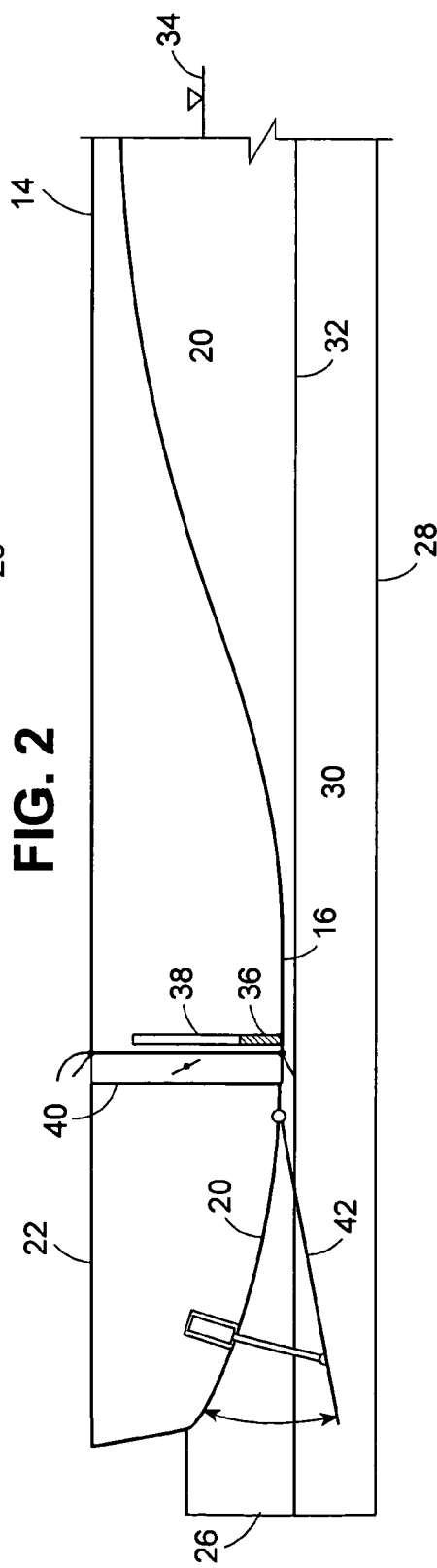

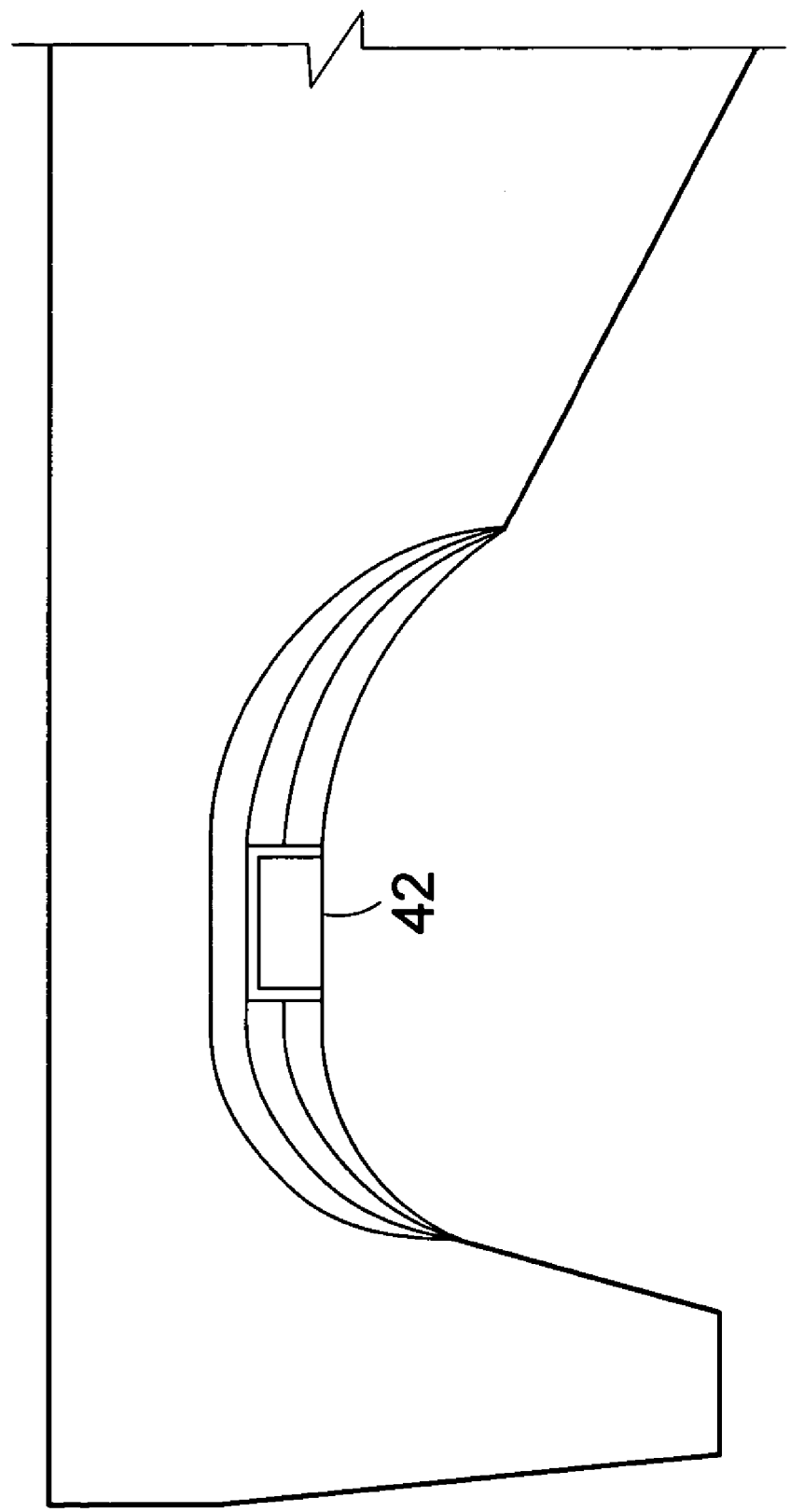

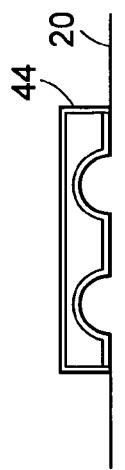
FIG. 4
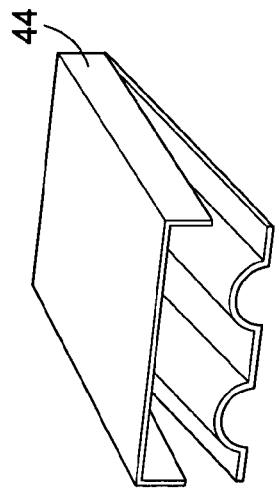
FIG. 4A
FIG. 5
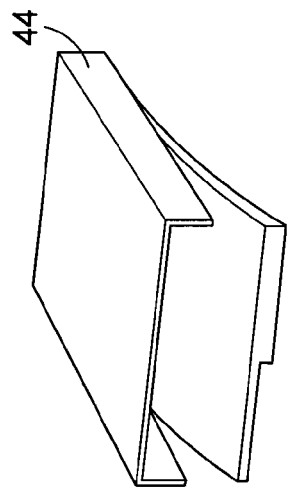
FIG. 5A
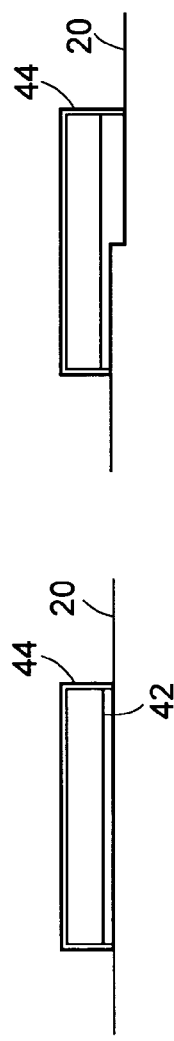
FIG. 6
FIG. 6A

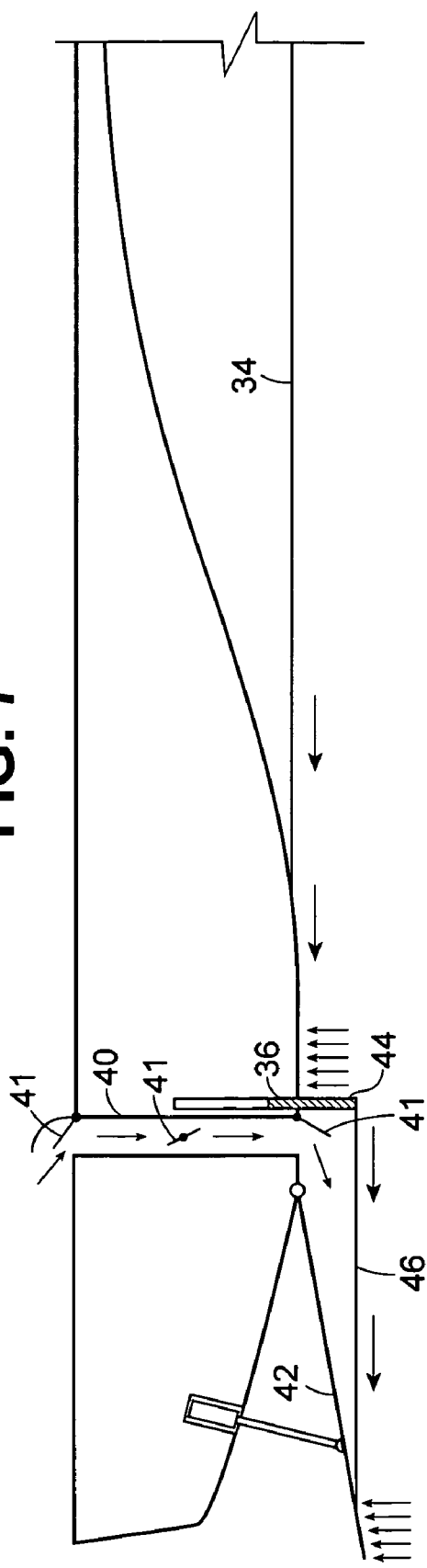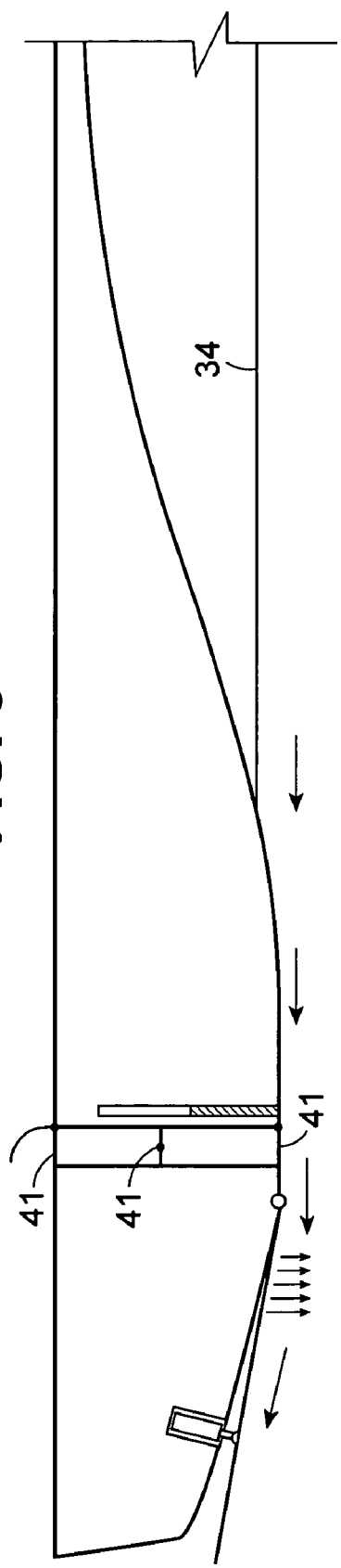

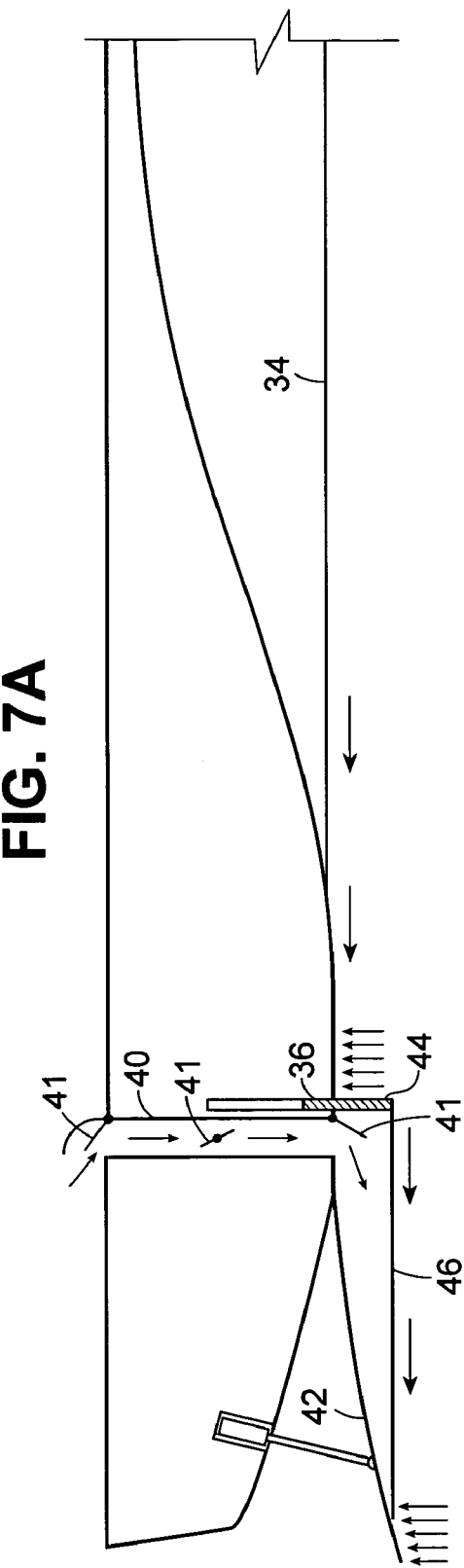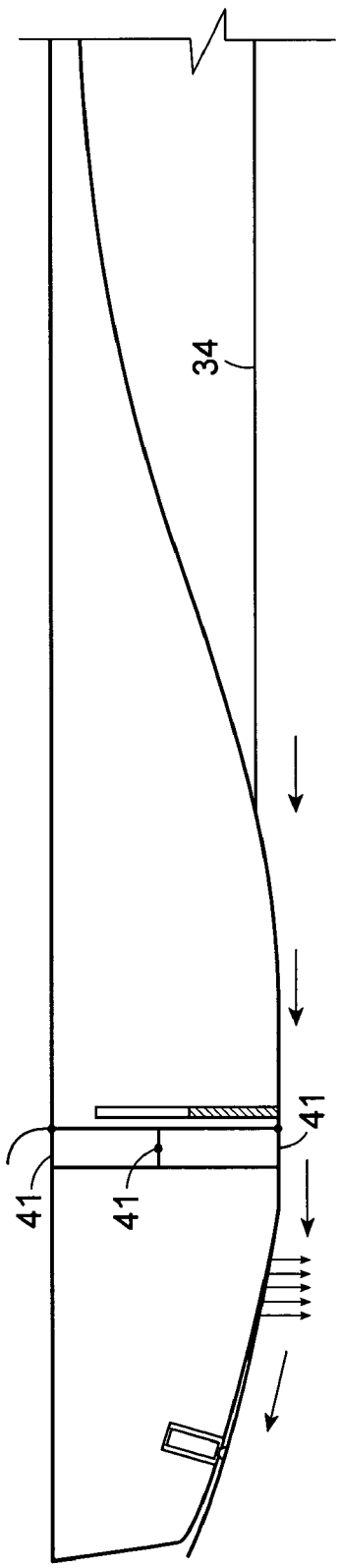

WATERCRAFT HULL WITH ENTRAPMENT TUNNEL

SUMMARY OF THE INVENTION

This application claims the benefit of U.S. Provisional Application No. 60/639,856, filed Dec. 27, 2004.

The present invention relates to boat hulls and more in particular to a watercraft hull having an air/water entrapment tunnel for improving lift.

BACKGROUND OF THE INVENTION

Field of the Invention

Great amounts of power are required to accelerate a watercraft to a speed where it transitions from its displacement mode (hull buoyant lift) to its planing mode (hull dynanmic lift) or "critical speed". Maximizing lift and minimizing drag at the critical speed is needed or the watercraft will not plane.

Watercraft hull drag reducing designs in the past have included stepped hulls, spray rails, running strakes, surface effect and/or watercraft hull high lift/drag (L/D) attachments or appendages such as trim tabs, flow interceptors (aka "spoilers"), and hydrofoils.

Because of viscous, wetted surface drag of a watercraft hull, efficiency at planing speeds is generally poor with a low L/D ratio. To achieve low drag at planing speeds, hull immersion in the water must be reduced by lifting a greater portion of the hull above the water surface or by ventilating the submerged portions of the hull to minimize the wetted hull surface.

A number of watercraft hulls of various designs incorporate entrapment tunnels to try to resolve the above issues. These tunnels are generally downwardly open concavities formed in the hull and extend aft from near the bow. The ceilings of such entrapment tunnels typically slope downward from near the bow towards the stern such that rear portions of the tunnels, including parts of their ceiling, are submerged at rest. This structure serves to channel air and/or water under the hull. Because the tunnels are more shallowly immersed than the lower portions of the hull, they entrap air under the hull for more lift and their additional drag is mitigated by tunnel ventilation which reduces wetted surface area. With increasing speed and hull lift, tunnel immersion in the water is reduced or eliminated. As more of the hull is lifted out of the water the tunnel sides serve to improve directional, pitch and roll stability.

Entrapment hulls have been used in the past in vessels such as the Hickman sea sled, Boston Whalers, tri-hulls (cathedral hulls), AEM, M-hulls, and quadrimarans. The entrapment tunnel ceilings in such vessels have been straight, sloped, "s" shape curved or stepped.

It is also known that controlling watercraft trim and heel is important to watercraft seaworthiness. Indeed, the lift to drag ratio (L/D) of a watercraft is in part controlled by its angle of trim relative to its speed. With insufficient trim lift will be low or with excessive trim lift will be generated with excessive drag. Moreover, optimizing watercraft seakeeping, handling and maneuverability requires different trim attitudes for different speeds, sea states and headings.

One of the methods to achieve trim control with high L/D efficiency is to attach flow interceptors at the transom or stern of a watercraft. Such flow interceptors project downwardly from the transom below the hull surface either vertically or at an angle. One such system is shown in U.S. Pat. No. 6,006,689. Such transom mounted flow interceptors reduce hull drag by providing lift which reduces hull immersion in the water. Reducing hull drag improves watercraft seakeeping and propulsive efficiency by providing trim control forces to achieve the optimal watercraft trim (which varies with speed) and watercraft wetted area for the sea conditions. However, such systems create large trimming moments that can push the bow down and create an adverse trim condition. To the extent such interceptors have been used on hulls having entrapment tunnels, they have been located at the transom as taught in the prior art.

It is an object of the present invention to increase dynamic lift in hulls having entrapment tunnels.

It is a further object of the invention to reduce wetted surface area and drag in hulls having entrapment tunnels.

Yet another object of the invention is to provide dynamic lift to a hull replacing buoyant lift lost by the presence of entrapment tunnels, while minimizing trimming moments on the hull.

The bent entrapment tunnel and interceptor structure (BETI) of the present invention is an improvement over prior art watercraft designs that increase hull L/D efficiency and increase trim controllability by using a unique configuration that integrates flaps, interceptors and a vent duct into a bent entrapment tunnel.

BRIEF DESCRIPTION OF THE INVENTION

In accordance with the present invention, a watercraft's hull is provided with one or more entrapment tunnels (ET) which, at a pre-determined length from the aft end of the submerged tunnel ceiling is bent upward, or reflexed, such that the aft end of the tunnel ceiling is at a higher elevation than portions of the tunnel ceiling forward of it. This results in the ceiling having a negative angle of attack relative to the free surface of the water beneath it as compared to the straight or downward sloped tunnel (with positive angle of attack) used in existing hulls.

In accordance with another aspect of the invention a novel arrangement of a flow interceptor and ventilation aperture are located in the lowest elevation of the tunnel ceiling forward of the stem rather than at the stem or transom as done with existing vessels. The result of this invention of a bent entrapment tunnel with an interceptor (BETI) is to improve the efficiency of the watercraft by increasing dynamic lift, reducing drag, providing trim control resulting in improved handling, maneuvering, seakeeping and seakindliness.

This hull configuration creates a variable height stepped hull form in the entrapment tunnel having a first stagnation point on the tunnel ceiling immediately forward of the deployed interceptor, which preferably is located at or slightly aft of the vessel's longitudinal center of gravity (LCG). The stagnation force produced is proportional to the interceptor deployment height. Water flow off the interceptor becomes completely separated from the ET ceiling by air sucked in from the vent aperture immediately behind the interceptor.

In accordance with yet another feature of the invention, the aft reflexed portion of the entrapment tunnel, aft of the interceptor may include an adjustable flap or trim tab to create a second stagnation point where separated flow from the interceptor reattaches onto the trim or flap in the tunnel. These phenomena generate additional lift on the hull (in addition to the existing dynamic lift and pressure lift from air entrapment in the tunnels), while lowering the trimming moment on the hull as compared to transom mounted interceptors. Large trimming moments eventually push the bow down to an excessive and adverse bow down trim condition and the onset of this condition will be reached later with the greater lifting force and lesser trimming moment provided by the BETI.

The interceptor also may be mounted to be retracted into the hull and an associated deployment actuation mechanism can be connected to ET vent duct flapper valve actuator to ensure the vent is opened when the interceptor is deployed.

In yet another aspect of the invention the tunnel sides act as side plates for the interceptors and trim flaps to improve L/D and side plates on the hull forward of the interceptor may also be pivoted.

The above and other objects, features and advantages of the present invention will become apparent from the following detailed description thereof, which is to be read in conjunction with the accompanying drawings, wherein:

BRIEF DESCRIPTION OF THE DRAWINGS

FIG. 1 is a partial front view of a watercraft hull having an entrapment tunnel in accordance with the present invention;

FIG. 2 is a schematic sectional side view of the hull of FIG. 1 taken along the line 2-2 of FIG. 1;

FIG. 3 is a schematic rear view of a hull entrapment tunnel in accordance with the present invention;

FIG. 4 is a schematic end view on an enlarged scale of a trim tab configuration located in the aft portion of the entrapment tunnel;

FIG. 4A is a perspective view of the trim tab shown in FIG. 4;

FIG. 5 is an end view of another trim tab used in the entrapment tunnel of the present invention;

FIG. 5A is a perspective view of the trim tab shown in FIG. 5;

FIG. 6 is an end view of yet another trim tab used in the entrapment tunnel of the present invention;

FIG. 6A is a perspective view of the trim tab shown in FIG. 6;

FIG. 7 is a sectional view similar to FIG. 2 showing the actuation of the valve structure in the ventilation duct for the entrapment tunnel and a rigid trim tab;

FIG. 7A is similar to FIG. 7 but showing use of a flexible trim tab;

FIG. 8 is a sectional view similar to FIG. 7 showing the valve structures in the ventilation tunnel closed upon retraction of the interceptor plate with a rigid trim tab;

FIG. 8A is similar to FIG. 8 but showing use of a flexible trim tab;

Referring now to the drawings in detail, and initially to FIG. 1, one-half of a boat hull 10 is illustrated which is constructed in accordance with the present invention. The other half of the hull (not shown) is a mirror image and identical in structure. Hull 10 has a pair of entrapment tunnels 12 formed therein (only one of which is seen in FIG. 1) having a generally arcuate shape from near the bow 14 to a point 16 at about the longitudinal center of gravity of the vessel. As seen in FIG. 1, the tunnel is generally arcuately shaped transverse to the direction of travel to form a curved ceiling 20. Towards the aft of the vessel tunnel 12 is reflexed, i.e., angled upwardly again towards the deck 22 of the hull, again with a generally arcuate ceiling 20, and extends to the transom 26. This provides a negative angle of attack to the free water surface at design planing speeds. Preferably, ceiling 20 is also curved or reflexed in the longitudinal direction as shown, but it could also be straight from the point 21 aft of the vent duct 40, described hereinafter, to the transom.

Figure 9:
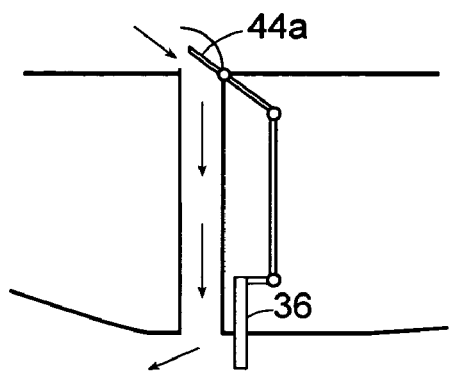
FIG. 9 is a schematic illustration of a mechanical linkage coordinating the motion of the ventilation duct upper valve with the actuation of the interceptor.
Figure 10:
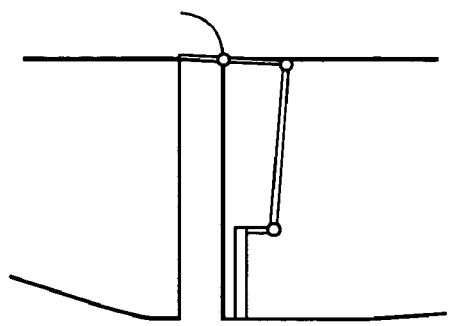
FIG. 10 is a view similar to FIG. 9 showing the valve closed and the interceptor retracted.
Figure 11:
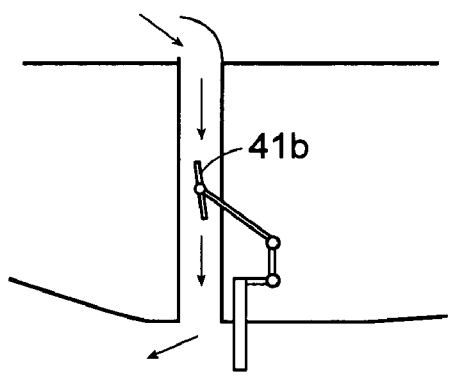
FIG. 11 shows a separate mechanical linkage connected between the interceptor deflector plate and the center vent duct valve with the valve in its open position.
Figure 12:
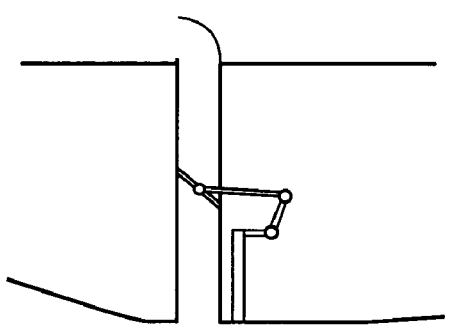
FIG. 12 shows the mechanism of FIG. 11 in its closed position.
Figure 13:
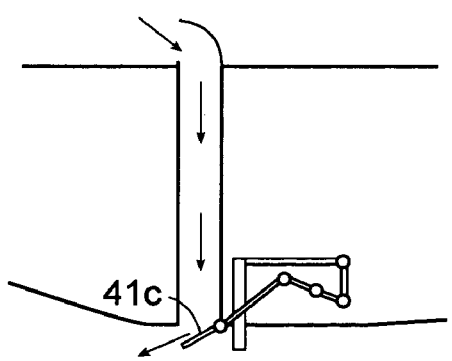
FIG. 13 is a schematic illustration of a mechanical linkage between the interceptor and the valve at the bottom of the vent duct, in its open position.
Figure 14:
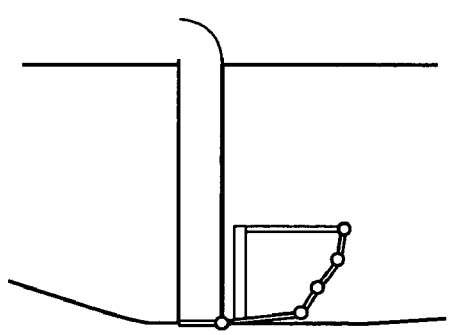
FIG. 14 is a similar view to FIG. 13 but showing the valve at the bottom of the vent duct in its closed position.

The hull has a keel 28 in the conventional manner and a bottom surface 30 which extends from the keel to a transition point 32 at which the entrapment tunnel commences. In operation, the vessel at rest in the water has a water line indicated by the reference numeral 34, which exposes the bow end of the tunnel to the atmosphere. Thus, as the vessel increases speed, air is entrapped in the tunnel, creating bow lift on the vessel.

In accordance with the present invention, immediately forward of the location of the reflex in the tunnel, an interceptor plate 36 is provided which is adapted to be moved from a retracted to an extended position below the bottom or ceiling surface of the tunnel at that point. The entrapment tunnel interceptor plate 36 creates an adjustable "cutwater" that allows the operator to control the height of the free surface of the water immediately behind the interceptor. When the plate is extended the water surface beneath the tunnel generally lies at the level of the lower edge of the plate so that, as described hereafter, the part of the tunnel above the water surface contains air, reducing the wetted surface area of the hull. The extension of the plate causes it to effectively function as a lift augmentation appendage by creating a high stagnation pressure on the hull immediately forward of the interceptor. It also further reduces drag by reducing the total area of the hull immersed in the water as the entire hull lifts as a result of the stagnation pressure in front of the interceptor. The interceptor is actuated in vertical movement in a track or slot 38 or the like, in any convenient manner as, for example, by means of a hydraulic ram or rams, or the like, as disclosed in U.S. patent application Ser. No. 10/834,930, the disclosure of which is incorporated herein by reference.

Preferably, an air ventilation duct 40 is provided in the hull immediately aft of the interceptor plate, which will allow air to enter the duct and be drawn downwardly by the suction provided when the interceptor plate is extended. This duct will allow the entrapment tunnel behind the interceptor to remain ventilated by the air drawn into the tunnel, thereby again reducing wetted surface area. As described hereinafter, the ventilation duct 40 is provided with a plurality of valves, which are operatively connected to the interceptor plate in any convenient manner, to close off the duct when the interceptor plate is retracted. In FIG. 2, the valves are schematically shown in an open position with the plate 36 retracted. However, in operation as described hereinafter, the valves are only open when the plate 36 is extended. They close when the plate is retracted.

In accordance with another aspect of the present invention a trim tab or rocker flap 42 is provided in the ceiling of the aft or reflexed portion of the entrapment tunnel to function as an aid to stabilization. If necessary, an additional trim tab or foil (not shown) can be provided at the transom. The trim tabs 42 are formed either of a rigid material, like aluminum, pivotally mounted to the hull at their forward end at point 21 in any convenient or known manner, or preferably the trim tabs are formed of a strong but resilient material like glass reinforced plastics (GRP) or fiberglass rigidly mount to the hull at point 21 so they will flex in operation, as shown in FIGS. 7A and 8A.

As seen in FIGS. 4-6, the trim tabs 42 can take any of a variety of configurations, and are adapted to be retracted into an enclosure space 44 formed in the top of the tunnel ceiling 20 in the hull. The trim tabs can be operated in any convenient manner, as for example, by hydraulic rams or the like, and can have a variety of configurations. For example, as shown in FIG. 4, the tabs are flat, while in FIG. 5 they are stepped. FIGS. 4A and 5A show the flexed or curved shapes the tabs will take when formed of a flexible, resilient material. In the embodiment of FIGS. 6 and 6A, the trims tabs are fluted to provide a streamlined control of the flow beneath them.

The sides of the entrapment tunnel act as side plates reducing vortex shedding off the interceptor and the trim flap sides, thereby reducing drag and creating higher stagnation pressures.

The function of the interceptor is illustrated schematically in FIGS. 7 and 8. In FIG. 7, the interceptor plate 36 is shown extended, with the valves 41 in the ventilation duct opened. The bottom 44 of the interceptor plate 36 forms a cutwater so that the water surface forms at the water line 46 indicated in the drawing. Air then flows through duct 40 to the space behind the interceptor and above the water line into the entrapment tunnel aft of the interceptor plate. The trim tab 42 is depressed, and intercepts the water line 46, to apply trimming pressure to the trim tab. Preferably the position of the vertical interceptor plate 24 is adjustable so that the amount of penetration of the plate into the water may be varied. In the extended position of the plate the cutwater level will engage the trim tab 42 and produce additional aft lift trimming forces indicated by the arrows A. The trim tab is extended in this condition by an actuator such as a hydraulic ram 43. Where a flexible tab is used, as shown in FIG. 7A, the ram causes the tab to flex in a curved shape.

In the retracted position of the interceptor plate, the water line 34 moves upwardly somewhat, and the water flow follows the tunnel ceiling, past the retracted interceptor plate against the retracted tunnel flap. This creates a Bernoulli effect in the water against the flap, producing a downward pressure or suction effect on the flap and the hull. This creates an aft down trimming pressure on the trim tab 42 ad indicated by the arrows B. Using a flexible tab produces a curved shape as shown in FIG. 8A produces a better Bernoulli effect suction than a flat plate.

The provision of an interceptor plate in this way creates an adjustable cutwater that allows the operator to control the height of the free surface of the water in the tunnel to reduce drag. The practical range of adjustment is small, perhaps up to 3 inches.

FIGS. 9 through 14 illustrate mechanical linkages for the three valves 41a, 41b and 41c located at the top, middle and bottom of the ventilation duct. These mechanical linkages can take any desired functional form, to respond to the upward and downward motion of the interceptor plate 36 to simultaneously open and close the ventilation duct, as described above. As illustrated in these figures, the linkages consist of pivotally connected articulated links and are readily understood by those skilled in the art.

It is noted that the flapper valve 41c is preferably pivotally mounted at the forward edge of the vent tunnel, aft of the interceptor, rather than on the opposite side thereof, in order to ensure that water flow will close the valve 41c when the interceptor is retracted, regardless of any actuator malfunction or damage.

Because the interceptor plate is forward of the transom, as compared to conventional systems, it is closer to the longitudinal center of gravity of the hull. Thus, the lift generated at the hull immediately forward of the interceptor has a lower pitching moment than if the pitch is generated at the transom, as occurs with conventional interceptors. This creates the further benefit of allowing greater lift to be generated without adversely effecting vessel trim.

Figure 15:
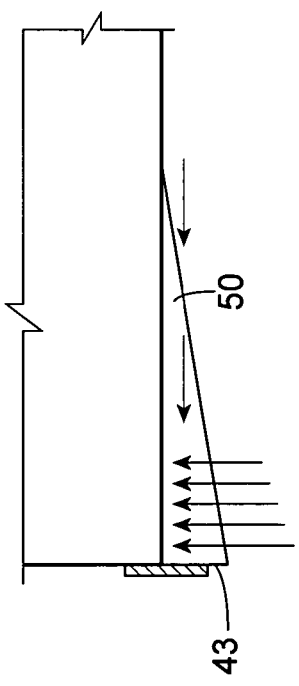
FIG. 15 is a schematic side sectional view of the interceptor plate in its deflected position relative to a pair of side plates on opposite sides thereof, not shown in FIG. 2.

FIG. 15 is a partial side sectional schematic view of the interceptor plate extended between a pair of triangularly shaped side plates described in patent application Ser. No. 10/834,930, mentioned above. The function of side plates 50 on the hull is to contain the stagnation pressure and to mitigate tip vortices from the tunnel and to prevent separated flow of the trailing edge of the interceptor which would occur if the tunnel was not ventilated.

The side plates may be fixed to the hull or secured to the interceptor plates for extension or retraction with it. Their rear vertical edges 43 may have a height of 2 to 4 inches and then the plates' height decreases as they extend forward, to essentially zero height to give them their triangular shape.

Figure 17:
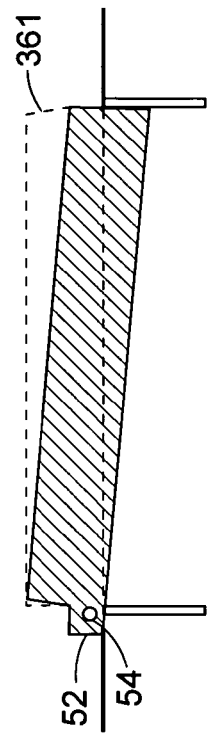
FIG. 17 is a schematic rear view of an interceptor plate which is pivotally actuated.
Figure 16:
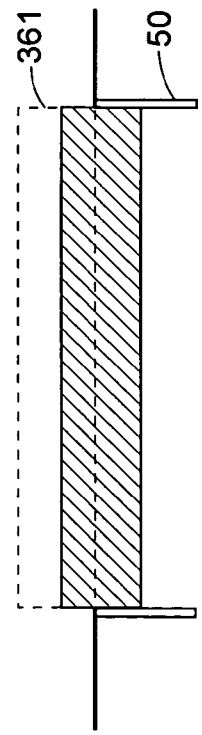
FIG. 16 is a rear view of the interceptor plate in its extended position, between the side plates.
Figure 18:
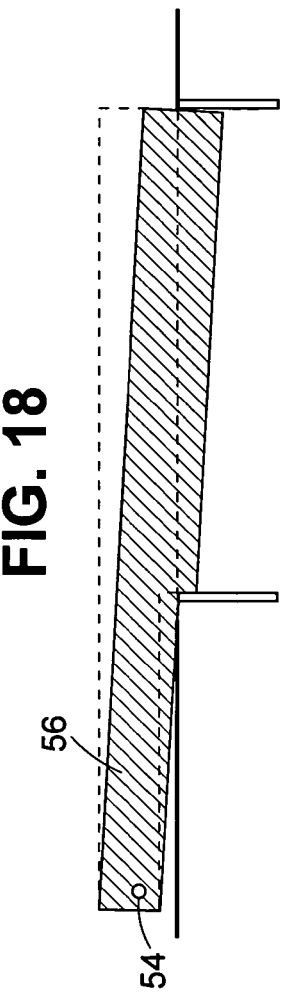
FIG. 18 is a rear view of another pivotally actuated interceptor plate.

FIGS. 16 through 18 illustrate various forms of the interceptor plate. FIG. 16 illustrates the plate from the rear between side plates 50, as a rectangular plate moving in a vertical direction from its extended solid line position to its retracted dotted line position 36'.

In another embodiment of the invention illustrated in FIG. 17, the interceptor plate is polygonal in shape, and pivotally mounted at one end 52 on a pivot pin 54 in order to pivot between the solid line extended position and the dotted line retracted position 36'.

Yet another form of interceptor plate having an extended mounting tab 56, pivotally mounted on a pin 54 is shown in FIG. 18.

These various forms of the interceptor plate allow the operator to control the amount and depth of immersion of the interceptor plates and to control whether that immersion is inboard or outboard relative to the keel.

At low planing speeds, where the interceptor plate will be intermittently ventilated, the interceptor and trip flap deployment is adjusted to correct trim and heel and minimize drag. The interceptor is used to adjust overall trim and the trim flap is used to correct transient conditions. At high speeds, in conditions where there is low probability of bow stuffing, the interceptor plate may be fully retracted and the trim flap deployed for reduced bow trim or recessed for greater bow trim. When running in headings where there is a substantial risk of bow stuffing, such as in heavy following seas, the trim flap is completely recessed to maintain the craft in a high bow up trim attitude. To continue to have active trim control, the interceptor can then be used, bearing deployment from the fully retracted default setting.

Although illustrative embodiments of the present invention have been described herein with reference to the accompanying drawings, it is to be understood that the invention is not limited to those precise embodiments and that various changes and modifications may be effected therein without departing from the scope or spirit of this invention.

What is claimed is:

1. A watercraft hull having at least one bent entrapment tunnel opening downwardly to the free water surface, said tunnel having a ceiling including a forward end portion located at the lowest elevation of the tunnel ceiling and an aft portion whose tunnel ceiling height increases continuously from said forward end portion to higher elevations than portions of the tunnel ceiling immediately in front of it to provide negative angle of attack with the free surface at design planing speeds.

2. A watercraft hull as defined in claim 1 including a movably mounted interceptor plate mounted in the tunnel ceiling forward of the transom at the lowest point of the entrapment tunnel ceiling.

3. A watercraft hull as defined in claim 2 including a ventilation duct in the hull extending from above the water line to the bottom of the hull behind the interceptor plate.

4. A watercraft hull as defined in claim 3 including a valve means at the tunnel ceiling vent duct aperture.

5. A watercraft hull having at least one bent entrapment tunnel with an aft portion whose tunnel ceiling is at a higher elevation than portions of the tunnel ceiling immediately in front of it to provide negative angle of attack with the free surface at design planning speeds; a movably mounted interceptor plate mounted in the tunnel ceiling forward of the transom at the lowest point of the entrapment tunnel ceiling; a ventilation duct in the hull extending from above the waterline to the bottom of the hull behind the interceptor plate; valve means at the tunnel ceiling ventilation duct aperture; and means for actuating the valve mans simultaneously with interceptor deployment.

6. A watercraft hull as defined in any of claims 1, 2, 3, 4 or 5 including a trim tab in the ceiling of the aft portion of the entrapment tunnel.

7. A watercraft hull as defined in claim 6 wherein said trim tab is flat.

8. A watercraft hull as defined in claim 6 wherein said trim tab has a stepped surface transverse to the keel of the hull.

9. A watercraft hull as defined in claim 6 wherein said trim tab is fluted in the fore and aft directions.

10. A watercraft hull as defined in claim 6 wherein said interceptor plate is movably mounted for movement in a vertical direction relative to the tunnel ceiling.

11. A watercraft hull as defined in claim 6 including means for moving said interceptor plate between an extended and retracted position.

12. A watercraft hull as defined in claim 6 wherein said trim tab is pivotally mounted at one end for pivotal movement between an extended and retracted position in a plane transverse to the hull keel.

13. A watercraft hull as defined in claim 12 including means for moving said interceptor plate between an extended and retracted position.

14. A watercraft hull as defined in claim 11 including side plates projecting from said hull forward of the interceptor plate.

15. A hull as defined in claim 14 wherein said side plates project from said hull approximately 2 to 4 inches at their ends adjacent the interceptor plate and taper forwardly to a height of approximately zero.

16. A watercraft hull as defined in claim 12 wherein said trim tab is formed of a rigid material.

17. A watercraft hull as defined in claim 6 wherein said trim tab is formed of a resilient flexible material.

18. A watercraft hull as defined in claim 6 wherein the ceiling of the aft portion of the entrapment tunnel is convexly curved in the longitudinal direction.

19. A watercraft hull as defined in claim 6 including means for extending and retracting the trim tab.

20. A watercraft hull having at least a pair of bent entrapment tunnels formed therein opening downwardly to the free water surface, said tunnels each having a forward position having a positive angle of attack to the free water surface and opening to the air above the free water surface at the bow and an aft portion which joins the forward portion at the lowest elevation of the ceilings of the respective tunnel portions and has a negative angle of attack to the free surface leading aft to higher elevations relative to the free water surface.

21. A watercraft hull as defined in claim 20 wherein each of said tunnels includes a movably mounted interceptor plate mounted in the tunnel ceiling forward of the transom at the lowest point between forward and aft positions of the entrapment tunnel ceiling.

22. A watercraft hull as defined in claim 21 including a ventilation duct in the hull extending form above the water line to the bottom of the hull behind the interceptor plates.

23. A watercraft hull as defined in claim 22 including a valve means at the tunnel ceiling vent duct aperture.

24. A watercraft hull as defined in claim 23 including means for actuating the valve mans simultaneously with interceptor deployment.

25. A watercraft hull as defined in any of claims 20, 21, 22, 23 or 24 including a trim tab in the ceiling of the aft portion of each entrapment tunnel.

26. A watercraft hull as defined in claim 25 wherein said trim tab is flat.

27. A watercraft hull as defined in claim 26 wherein said trim tab is formed of a flexible material.

28. A watercraft hull as defined in claim 25 wherein said trim tab has a stepped surface transverse to the keel of the hull.

29. A watercraft hull as defined in claim 25 wherein said trim tab is fluted in the fore and aft directions.

30. A watercraft hull as defined in claim 25 wherein said interceptor plate is movably mounted for movement in a vertical direction relative to the tunnel ceiling.

31. A watercraft hull as defined in claim 30 including means for moving said interceptor plate between an extended and retracted position.

32. A watercraft hull as defined in claim 26 wherein said trim tab is pivotally mounted at one end for pivotal movement between an extended and retracted position in a plane transverse to the hull keel.

33. A watercraft hull as defined in claim 26 wherein the trim tab is formed of a rigid material.

34. A watercraft hull as defined in claim 28 including means for moving said trim tab between an extended and retracted position.

35. A watercraft hull as defined in claim 34 wherein the trim tab is a flexible material.

36. A watercraft hull as defined in claim 31 including side plates projecting from said hull forward of the interceptor plate.

37. A watercraft hull as defined in claim 21 wherein said side plates project from said hull approximately 2 to 4 inches at their ends adjacent the interceptor plate and taper forwardly to a height of approximately zero.

* * * * *